US011473031B2

(12) United States Patent
Sloan

(10) Patent No.: US 11,473,031 B2
(45) Date of Patent: *Oct. 18, 2022

(54) MOTOR OIL BLEND AND METHOD FOR REDUCING WEAR ON STEEL AND ELIMINATING ZDDP IN MOTOR OILS BY MODIFYING THE PLASTIC RESPONSE OF STEEL

(71) Applicant: BestLine International Research, Inc., Schenectady, NY (US)

(72) Inventor: Ronald J. Sloan, Blaine, WA (US)

(73) Assignee: BESTLINE INTERNATIONAL RESEARCH, INC., Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,284

(22) Filed: Sep. 20, 2020

(65) Prior Publication Data

US 2021/0002575 A1  Jan. 7, 2021

Related U.S. Application Data

(63) Continuation of application No. 15/831,036, filed on Dec. 4, 2017, now abandoned, which is a continuation
(Continued)

(51) Int. Cl.
| | |
|---|---|
| *C10M 161/00* | (2006.01) |
| *C10M 143/08* | (2006.01) |
| *C10M 127/00* | (2006.01) |
| *C07F 17/00* | (2006.01) |
| *C08G 61/02* | (2006.01) |
| *C08K 3/16* | (2006.01) |
| *C10M 125/06* | (2006.01) |
| *C10M 131/00* | (2006.01) |
| *C10M 169/04* | (2006.01) |
| *C10N 30/02* | (2006.01) |

(Continued)

(52) U.S. Cl.
CPC ........... *C10M 161/00* (2013.01); *C07F 17/00* (2013.01); *C08G 61/02* (2013.01); *C08K 3/16* (2013.01); *C10M 125/06* (2013.01); *C10M 127/00* (2013.01); *C10M 131/00* (2013.01); *C10M 143/08* (2013.01); *C10M 169/04* (2013.01); *C10M 2201/042* (2013.01); *C10M 2203/02* (2013.01); *C10M 2203/10* (2013.01); *C10M 2203/102* (2013.01); *C10M 2203/1006* (2013.01); *C10M 2203/1025* (2013.01); *C10M 2205/028* (2013.01); *C10M 2205/0285* (2013.01); *C10M 2213/062* (2013.01); *C10M 2219/044* (2013.01); *C10M 2219/046* (2013.01); *C10N 2030/02* (2013.01); *C10N 2030/08* (2013.01); *C10N 2030/10* (2013.01); *C10N 2030/40* (2020.05); *C10N 2030/42* (2020.05); *C10N 2030/43* (2020.05); *C10N 2030/64* (2020.05); *C10N 2030/74* (2020.05); *C10N 2040/25* (2013.01); *C10N 2060/02* (2013.01)

(58) Field of Classification Search
CPC .................. C10M 161/00; C10M 143/08; C10M 127/00; C10M 169/04; C10M 131/00; C10M 125/06; C10M 2203/1006; C10M 2201/042; C10M 2213/062; C10M 2203/02; C10M 2219/046; C10M 2219/044; C10M 2203/102; C10M 2205/0285; C10M 2203/10; C10M 2203/1025; C10M 2205/028; C08G 61/02; C08K 3/16; C07F 17/00; C10N 2030/10; C10N 2030/02; C10N 2030/08; C10N 2060/02; C10N 2030/43; C10N 2030/64; C10N 2030/42; C10N 2030/40; C10N 2040/25; C10N 2030/74
See application file for complete search history.

(56) References Cited

U.S. PATENT DOCUMENTS

| | | |
|---|---|---|
| 2,055,456 A | 9/1936 | Eichwald |
| 2,124,628 A | 7/1938 | Moser |
| | (Continued) | |

FOREIGN PATENT DOCUMENTS

| | | |
|---|---|---|
| CA | 2496921 A1 | 8/2006 |
| CN | 1209452 A | 3/1999 |
| | (Continued) | |

OTHER PUBLICATIONS

Rudnick, Leslie R., Ed., Synthetic Mineral Oils and Bio Based Lubricants: Chemistry and Technology, Taylor & Francis (2006).
(Continued)

*Primary Examiner* — Taiwo Oladapo
(74) *Attorney, Agent, or Firm* — Heslin Rothenberg Farley & Mesiti P.C.; Kristian E. Ziegler, Esq.

(57) ABSTRACT

An environmentally-improved motor oil blend and related methods for properly lubricating components of an engine and favorably modifying a plastic response of components of the engine, the blend being free of zinc di-alkyl-dithiophosphates (ZDDP) and free of zinc di-thiophosphate (ZDTP), comprising: a motor oil selected from the motor oil group consisting of Group I, Group II, Group III, Group IV, and Group V motor oils; a motor oil additive comprising alpha-olefins and hydroisomerized hydro-treated severe hydrocracked base oil; ZDDP omitted from the chemical constituents of the motor oil; and ZDTP omitted from the chemical constituents of the motor oil.

16 Claims, No Drawings

Related U.S. Application Data of application No. 15/508,137, filed as application No. PCT/US2016/015256 on Jan. 28, 2016, now abandoned, said application No. 15/831,036 is a continuation-in-part of application No. 15/090,797, filed on Apr. 5, 2016, now Pat. No. 9,932,538, and a continuation of application No. 14/699,924, filed on Apr. 29, 2015, said application No. 15/090,797 is a continuation of application No. 13/822,385, filed as application No. PCT/US2011/052279 on Sep. 20, 2011, now Pat. No. 9,309,482, said application No. 13/822,385 is a continuation of application No. 12/887,834, filed on Sep. 22, 2010, now Pat. No. 8,334,244, said application No. PCT/US2011/052279 is a continuation of application No. 12/887,834, filed on Sep. 22, 2010, now Pat. No. 8,334,244.

(60) Provisional application No. 62/287,942, filed on Jan. 28, 2016, provisional application No. 62/109,172, filed on Jan. 29, 2015.

(51) Int. Cl.
| | |
|---|---|
| C10N 30/08 | (2006.01) |
| C10N 30/10 | (2006.01) |
| C10N 30/00 | (2006.01) |
| C10N 40/25 | (2006.01) |
| C10N 60/02 | (2006.01) |

(56) References Cited

U.S. PATENT DOCUMENTS

| | | |
|---|---|---|
| 2,133,734 A | 10/1938 | Moser |
| 2,270,577 A | 1/1942 | Bergstrom et al. |
| 2,402,325 A | 6/1946 | Greisinger et al. |
| 2,418,894 A | 4/1947 | McNab et al. |
| 2,485,861 A | 10/1949 | Sumner et al. |
| 2,501,731 A | 3/1950 | Mertes |
| 3,406,419 A | 10/1968 | Young |
| 3,480,550 A | 11/1969 | Henderson |
| 3,984,599 A | 10/1976 | Norton |
| 4,127,491 A | 11/1978 | Reick |
| 4,131,551 A | 12/1978 | Thompson et al. |
| 4,218,330 A | 8/1980 | Shubkin |
| 4,224,170 A | 9/1980 | Haugen |
| 4,224,173 A | 9/1980 | Reick |
| 4,228,021 A | 10/1980 | Lenack |
| 4,261,840 A | 4/1981 | Gragson |
| 4,375,418 A | 3/1983 | Zoleski et al. |
| 4,387,033 A | 6/1983 | Lenack et al. |
| 4,443,348 A | 4/1984 | Wright et al. |
| 4,483,195 A | 11/1984 | Brown et al. |
| 4,504,404 A | 3/1985 | Schumacher et al. |
| 4,534,873 A | 8/1985 | Clark |
| 4,543,195 A | 9/1985 | Grangette et al. |
| 4,597,880 A | 7/1986 | Eliades |
| 4,640,792 A | 2/1987 | Groenhof et al. |
| 4,659,488 A | 4/1987 | Vinci |
| 4,844,825 A | 7/1989 | Sloan |
| 4,859,359 A | 8/1989 | DeMatteo et al. |
| 4,879,053 A | 11/1989 | Matthews et al. |
| 4,946,510 A | 8/1990 | Kinnebrew et al. |
| 4,956,122 A | 9/1990 | Watts et al. |
| 5,013,463 A | 5/1991 | Slama |
| 5,120,358 A | 6/1992 | Pippett |
| 5,136,118 A | 8/1992 | Buchanan et al. |
| 5,169,564 A | 12/1992 | Gallacher et al. |
| 5,202,040 A | 4/1993 | Sanderson et al. |
| 5,332,516 A | 7/1994 | Stephens |
| 5,364,994 A | 11/1994 | Scharf |
| 5,431,841 A | 7/1995 | Lockhart |
| 5,439,602 A | 8/1995 | Eckard et al. |
| 5,505,867 A | 4/1996 | Ritter |
| 5,578,235 A | 11/1996 | Jao et al. |
| 5,631,211 A | 5/1997 | Nakagawa et al. |
| 5,672,572 A | 9/1997 | Arai et al. |
| 5,681,797 A | 10/1997 | Lawate |
| 5,741,764 A | 4/1998 | Patel et al. |
| 5,885,942 A | 3/1999 | Zhang et al. |
| 5,888,281 A | 3/1999 | Longo |
| 5,972,853 A | 10/1999 | Boffa et al. |
| 6,008,164 A | 12/1999 | Aldrich et al. |
| 6,046,142 A | 4/2000 | Zilonis et al. |
| 6,074,993 A | 6/2000 | Waddoups et al. |
| 6,143,701 A | 11/2000 | Boffa |
| 6,323,162 B1 | 11/2001 | Yasunori et al. |
| 6,413,916 B1 | 7/2002 | Baumgart et al. |
| 6,551,967 B2 | 4/2003 | King et al. |
| 6,761,645 B1 | 7/2004 | Weber |
| 6,774,091 B2 | 8/2004 | Dituro et al. |
| 6,858,567 B2 | 2/2005 | Akao |
| 6,919,300 B2 | 7/2005 | Dituro |
| 6,962,895 B2 | 11/2005 | Scharf et al. |
| 6,992,049 B2 | 1/2006 | Deckman et al. |
| 7,018,960 B2 | 3/2006 | Negoro et al. |
| 7,022,766 B2 | 4/2006 | Okada et al. |
| 7,055,534 B2 | 6/2006 | Goode et al. |
| 7,109,152 B1 | 9/2006 | Corby et al. |
| 7,124,728 B2 | 10/2006 | Carey et al. |
| 7,745,382 B2 | 6/2010 | Sloan |
| 7,776,233 B2 | 8/2010 | Arafat et al. |
| 7,931,704 B2 | 4/2011 | Sloan |
| 8,022,020 B2 | 9/2011 | Sloan |
| 8,039,424 B2 | 10/2011 | Sloan |
| 8,062,388 B2 | 11/2011 | Sloan |
| 8,071,513 B2 | 12/2011 | Sloan |
| 8,071,522 B2 | 12/2011 | Sloan |
| 8,168,572 B2 | 5/2012 | Thoen et al. |
| 8,268,022 B2 | 9/2012 | Sloan |
| 8,334,244 B2 | 12/2012 | Sloan |
| 8,377,861 B2 | 2/2013 | Sloan |
| 8,415,280 B2 | 4/2013 | Sloan |
| 8,491,676 B2 | 7/2013 | Sloan |
| 8,623,807 B2 | 1/2014 | Sloan |
| 8,771,384 B2 | 7/2014 | Sloan |
| 10,400,192 B2 | 9/2019 | Sloan |
| 2001/0036906 A1 | 11/2001 | Locke et al. |
| 2003/0040444 A1 | 2/2003 | Garmier |
| 2003/0087769 A1 | 5/2003 | Dituro et al. |
| 2004/0014613 A1 | 1/2004 | Dituro et al. |
| 2004/0060229 A1 | 4/2004 | Todd et al. |
| 2004/0077506 A1 | 4/2004 | Arrowsmith et al. |
| 2004/0102335 A1 | 5/2004 | Carrick et al. |
| 2006/0160708 A1* | 7/2006 | Sloan ............... C10M 169/04 508/183 |
| 2008/0182769 A1 | 7/2008 | Sloan |
| 2008/0190014 A1 | 8/2008 | Volkel et al. |
| 2008/0236538 A1 | 10/2008 | Lam |
| 2010/0261626 A1 | 10/2010 | Sloan |
| 2010/0269404 A1 | 10/2010 | Sloan |
| 2010/0273687 A1 | 10/2010 | Sloan |
| 2010/0273688 A1 | 10/2010 | Sloan |
| 2011/0009301 A1 | 1/2011 | Sloan |
| 2011/0015103 A1* | 1/2011 | Sloan ............... C10M 169/044 508/154 |
| 2011/0197499 A1 | 8/2011 | Sloan |
| 2012/0035087 A1 | 2/2012 | Sloan |
| 2012/0060410 A1 | 3/2012 | Sloan |
| 2012/0077720 A1 | 3/2012 | Sloan |
| 2012/0077724 A1 | 3/2012 | Sloan |
| 2013/0157918 A1 | 6/2013 | Sloan |
| 2013/0178403 A1 | 7/2013 | Sloan |
| 2013/0298450 A1 | 11/2013 | Sloan |
| 2014/0305030 A1 | 10/2014 | Sloan |
| 2020/0002641 A1 | 1/2020 | Sloan |

FOREIGN PATENT DOCUMENTS

| | | |
|---|---|---|
| CN | 101805657 A | 8/2010 |
| DE | 19723460 A1 | 1/1998 |
| EP | 0361180 A1 | 4/1990 |
| EP | 0837122 A2 | 4/1998 |

(56) References Cited

FOREIGN PATENT DOCUMENTS

| | | |
|---|---|---|
| EP | 1203803 A1 | 5/2002 |
| EP | 1736529 A1 | 12/2006 |
| EP | 2619292 A2 | 7/2013 |
| FR | 2193080 | 7/1972 |
| JP | 59204700 | 11/1984 |
| JP | 07233001 | 9/1995 |
| JP | 2001-271077 A | 10/2001 |
| WO | 1997019153 | 5/1997 |
| WO | 2002034867 A1 | 5/2002 |
| WO | 2003064571 A1 | 8/2003 |
| WO | 2006-015800 A1 | 2/2006 |
| WO | 2006100188 A1 | 9/2006 |
| WO | 2007004789 A1 | 1/2007 |
| WO | 2009078882 A1 | 6/2009 |
| WO | 2009079020 A1 | 6/2009 |
| WO | 2009085957 A1 | 7/2009 |
| WO | 2009085967 A1 | 7/2009 |
| WO | 2011/094571 A1 | 8/2011 |
| WO | 2012-40153 A2 | 3/2012 |
| WO | 2012-40153 A3 | 3/2012 |

OTHER PUBLICATIONS

Journal of Automotive Engineering, May 1, 2001, vol. 55, No. 5, pp. 67-72.
Journal of Automotive Engineering, May 1, 2001, vol. 55, No. 5, pp. 67-72, English translation of: p. 70, last paragraph; Figures 6 and 7.
Kioupis, L.I. ; Maginn, E.J., Molecular simulation of poly-{alpha}-olefin synthetic lubricants: Impact of molecular architecture on performance properties, Journal of Physical Chemistry B: Materials, Surfaces, Interfaces, amp Biophysical; Journal vol. 103; Journal Issue: 49; Dec. 9, 1999.
http://www.sasoltechdata.com/MSDS/SASOLAB_C12L.pdf.
United States Environmental Protection Agency, "Status Report, Chemical Activities," Third Edition, vol. I (Jun. 1982), cover page, pp. 21, 38, 201.
40 CFR 700 to 789, Revised as of Jul. 1, 2006. cover page, p. 52.
Leslie R. Rudnick, Lubricant Additives: Chemistry and Applications, section 17.4.6, p. 428 (2009).
Corrosion Inhibitors, http://www.chemtura.com/bu/v/index.jsp?vgnextoid=2e6aeaa547e9f010VgnVCM100000b70215acRCRD&vgnextchannel=
2e6aeaa547e9f010VgnVCM100000b70215acRCRD, printed on Jan. 22, 2014.
Calcinate C-300CS, http://www.chemtura.com/bu/v/index.jsp?vgnextoid=851c81a7bfd01110VgnVCM1000008ed7010aRCRD&vgnextchannel=2e6aeaa547e9f010VgnVCM100000b70215acRCRD&vgnextfmt=default, printed on Jan. 22, 2014.
International search report dated May 11, 2016 for PCT/US16/15256.
International Preliminary Report on Patentability, dated Feb. 28, 2017, finding that the subject matter of the claims in counterpart application PCT/US16/15256 are novel and involve an inventive step under PCT articles 33(2) and (3).
Declaration Traversing Rejection under 37 CFR 1.132 for U.S. Appl. No. 14/699,924, by Prof. Nicholas D. Spencer, Department of Materials, ETH Zürich, Switzerland and by Prof. Stefano Mischler, Institute for Materials, EPF Lausanne, Switzerland.
http://www.sccoa.com/forums/showthread.php?136304-What-oil-brands-offer-the-best-protection-*Good-read*, printed Jun. 23, 2019.
https://www.portcityracecars.com/KENDALL-OIL-GT-1-HI-PERF-20W50.html, printed Jun. 23, 2019.

\* cited by examiner

MOTOR OIL BLEND AND METHOD FOR REDUCING WEAR ON STEEL AND ELIMINATING ZDDP IN MOTOR OILS BY MODIFYING THE PLASTIC RESPONSE OF STEEL

CROSS REFERENCE TO RELATED APPLICATIONS

This application is a continuation of application U.S. Ser. No. 15/831,036 filed Dec. 4, 2017. Said U.S. Ser. No. 15/831,036 is a continuation of U.S. Ser. No. 14/699,924 filed Apr. 29, 2015, which in turn claims benefit of provisional application U.S. Ser. No. 62/109,172 filed Jan. 29, 2015, which is hereby incorporated by reference in its entirety. Said U.S. Ser. No. 15/831,036 is also a continuation of now-abandoned application U.S. Ser. No. 15/508,137 filed Mar. 2, 2017, which is a US national application based on PCT/US16/15256 filed Jan. 28, 2016. Said PCT/US16/15256 in turn claims benefit of provisional applications 62/287,942 filed Jan. 28, 2016, and 62/109,172 filed Jan. 29, 2015. Said U.S. Ser. No. 15/831,036 is also a continuation-in-part of application Ser. No. 15/090,797 filed Apr. 5, 2016, now U.S. Pat. No. 15/090,797 is a continuation of application U.S. Ser. No. 13/822,385 filed Mar. 12, 2013, now U.S. Pat. No. 9,309,482 issued Apr. 12, 2016. Said U.S. Ser. No. 13/822,385 is a US national stage application based on expired application PCT/US11/52279 filed Sep. 20, 2011. Said Ser. No. 13/822,385 and PCT/US11/52279 are continuations of application U.S. Ser. No. 12/887,834 filed Sep. 22, 2010, now U.S. Pat. No. 8,334,244 issued Dec. 18, 2012.

BACKGROUND OF THE INVENTION

The field of this invention relates to the latest technology for substantially reducing steel-to-steel wear along with eliminating the need for Zinc Dialkyldithiophosphates (ZDDP) in motor oils as an anti-wear component. The composition of this invention has been shown to modify the plastic response of steel while having a positive influence on the chemical reactivity of the surfaces subjected to being worn down due to friction. Specifically, based on the tribological testing detailed in U.S. 62/109,172, spectroscopic analysis of the wear tracks of an engine disk revealed that chemical elements like P, S, Mn, Zn, which can be from the ZDDP in the oil, were not detected. This suggests that this composition inhibits the reaction of ZDDP and renders it unnecessary for reducing wear.

This is important, because today there is a movement within a number of states and countries to remove or substantially reduce the need for ZDDP in motor oils. Environmentalists in the US have lobbied both State and Federal departments to legislate such a ban. Unfortunately, governments have been reluctant to issue or enforce such a ban until a cost-effective alternative becomes available which can have the same or better anti-wear performance results as ZDDP, while eliminating the need for ZDDP itself.

There are in fact two types of zinc-thiophosphates universally added to motor oils used today: zinc di-alkyl-di-thiophosphates (which is ZDDP proper), and/or zinc di-thiophosphate (which is often abbreviated to ZDTP). Unless otherwise specified, when the acronym ZDDP is used in this disclosure, it is being used to refer to either of these, with or without the di-alkyl group. And specifically, the composition of this invention eliminates the need for either of ZDDP-proper, or ZDTP to be used in motor oils any longer.

The automotive industry was much simpler in the early days. Engines bearings were made from a soft tin/copper/antimony alloy, commonly referred to as babbitt. This alloy is relatively inert chemically and has the ability to absorb small amounts of foreign particulate material. But, as engine horsepower increased, babbitt alloy surfaces proved to be inadequate to bear the increased loading on these surfaces.

Thus, the need for harder bearings arose, and new types of bearings with cadmium/silver, cadmium/nickel, and copper/lead construction were developed. Such bearings were much stronger, but were not as chemically inert as babbitt and could be attacked by the acids generated from oil oxidation. These new bearings were unable to absorb foreign material such as carbon, grit and wear debris into the bearing material, and consequently, improvements in oil filtration were developed and used in vehicles to decrease premature wear.

Further, bearing corrosion inhibitors, anti-wear agents and acid inhibitor compounds were developed to protect these new bearings. There was a need to protect the bearings against both corrosive and mechanical wear, and many of these compounds served both functions. Compounds such as sulfurized sperm oil, organic phosphates, dithiocarbonates and dithiophosphates were experimented with to reduce premature wear. In 1941, Lubrizol developed Zinc Dialkyl-dithiophosphates, which remain the most commonly-used form of ZDDP, and introduced these to the market.

Initially, ZDDP was added to motor oils in low concentrations of less than 0.3% by volume as a bearing passivator, defined as treating or coating a metal in order to reduce the chemical reactivity of its surface. In addition, ZDDP was found to be a remarkably effective anti-wear agent; a true extreme-pressure (EP) additive for heavily loaded steel-on-steel sliding mechanisms such as camshafts and valve lifters or tappets. During these years, there was little if any concern about the impact of ZDDP upon the environment.

For years, these ZDDP additives have been providing sufficient anti-wear service, starting with the early days of gasoline and diesel non-detergent motor oils, through the present day. Diesel engines of more than half a century ago, which generally operated at lower speeds and were more massively built, did not exhibit the same wear problems. But in a gasoline engine, the valve train is more heavily stressed due to the higher engine speeds, and these additives have played and continue to play an important role in reducing wear.

Current and previous motor oils have depended upon the use of ZDDP as a means to protect against premature wear between bearing surfaces and from steel-to-steel contact. In view especially of the detrimental impact of ZDDP on the environment, it would be desirable to have available a replacement additive which can eliminate the need for ZDDP, which additive at the same time provides the same level of protection—and even better protection—for engine components.

In U.S. Pat. No. 7,745,382, which was the first of several US and foreign patents issued to Ronald J. Sloan and assigned to BestLine International Research Inc. (BestLine) who are the inventor and assignee for the present application as well, it was disclosed that a synthetic lubricant additive comprising polymerized alpha-olefins (PAOs), hydroisomerized hydro-treated severe hydrocracked base oil, and synthetic sulfonates could provide better engine lubrication and reduce engine wear, and that in fact the PAOs and the base oils could be the primary composition for a broad range of lubricants useful in many different circumstances including and beyond automotive applications, and as applied to many different materials including and beyond steel. This includes diesel fuel additives (U.S. Pat. No. 8,062,388 et. seq.), gasoline additives (U.S. Pat. No. 7,931,704 et. seq.), general purpose lubricants (U.S. Pat. No. 8,022,020 et. seq.), marine lubricants (U.S. Pat. No. 8,334,244 et. seq.) and even golf club cleaners (U.S. Pat. No. 8,071,522 et. seq.).

But until the tribological testing detailed in U.S. 62/109,172, the tribological mechanism underlying the effectiveness of BestLine's synthetic lubricant additive was not fully understood. This testing established that not only did this PAO, base oil and (optionally) synthetic sulfonate composition enhance lubrication, but this composition was also found to modify the plastic response of the investigated steel and to influence the chemical reactivity of the worn surfaces. Particularly, as noted above, because elements like P, S, Mn, Zn were not detected when this composition was added to engine oils with ZDDP, this means that this composition inhibits the reaction of ZDDP and renders ZDDP unnecessary for reducing wear if the PAO and base oil is employed as a substitute.

Thus, it was only with the new understandings first disclosed in U.S. 62/109,172, that consideration could be given to adding this PAO, base oil and optionally synthetic sulfonate composition to motor oils, while at the same time removing all of the ZDDP and/or ZDTP from these very same motor oils. Thus, the addition of this PAO, base oil, sulfonate composition to motor oils simultaneously with the removal of all forms of ZDDP not only reduces engine wear by superior lubrication, but also favorably modifies the plastic response of all steel elements which it lubricates, and at the same time solves an important environmental problem.

The use of this composition to improve motor oils while removing the environmental harm caused by ZDDP and ZDTP is applicable to all of the five groups of motor oil as defined by the American Petroleum Institute (API). This API categorization is hereby incorporated by reference into this disclosure and its associated claims. Specifically, the September 2011 standards of the API at http://www.api.org/~/media/files/certification/engine-oil-diesel/publications/appendix-e-rev-09-01-11.pdf?la=en specify as follows:

"All base stocks are divided into five general categories
a. Group I base stocks contain less than 90 percent saturates and/or greater than 0.03 percent sulfur and have a viscosity index greater than or equal to 80 and less than 120 using the test methods specified in Table E-1.
b. Group II base stocks contain greater than or equal to 90 percent saturates and less than or equal to 0.03 percent sulfur and have a viscosity index greater than or equal to 80 and less than 120 using the test methods specified in Table E-1.
c. Group III base stocks contain greater than or equal to 90 percent saturates and less than or equal to 0.03 percent sulfur and have a viscosity index greater than or equal to 120 using the test methods specified in Table E-1.
d. Group IV base stocks are polyalphaolefins (PAO). PAOs can be interchanged without additional qualification testing as long as the interchange PAO meets the original PAO manufacturer's specifications in physical and chemical properties. The following key properties need to be met in the substituted stock:
1) Kinematic viscosity at 100° C., 40° C., and −40° C.
2) Viscosity index
3) NOACK volatility
4) Pour point
5) Unsaturates e. Group V base stocks include all other base stocks not included in Group I, II, III, or IV.

TABLE E-1

Analytical Methods for Base Stock

| Property | Test Method |
|---|---|
| Saturates | ASTM D2007 |
| Viscosity index | ASTM D2270 |
| Sulfur | ASTM D1552 |
| (use one listed method) | ASTM D2622 |
| | ASTM D3120 |
| | ASTM D4294 |
| | ASTM D4927" |

SUMMARY OF THE INVENTION

An additive and related method for modifying the plastic response of steel, the additive comprising: polymerized alpha olefins; hydroisomerized hydro-treated severe hydrocracked base oil; and optionally, synthetic sulfonates. A tribological study detailed in U.S. 62/109,172 and herein concludes that: (1) This additive significantly reduces wear of the carbon steel disk to 6% of the wear observed in pure oil without additive; (2) There is no obvious effect of the additive on friction except a slightly better stability with time of the coefficient of friction; (3) The additive appears to inhibit the reaction of ZDDP and renders ZDDP unnecessary for reducing wear. This suggests that the additive may be a replacement for ZDDP in motor oils; and (4) The additive was found to modify the plastic response of the investigated steel and to influence the chemical reactivity of the worn surfaces. Although testing was not conducted to establish the coefficient of friction, as this will be concluded at a later time, previous testing supports that the friction is reduced.

This invention is for a synthetic lubricant additive that can be added at various ratios to provide the need protect against steel-to-steel wear or between bearing and steel surfaces, as well as related method of manufacturing this additive and related methods of its use. Further, this additive can be added to synthetic, synthetic blends and non-synthetic motor oils (motor oils in all of Groups I through V) to provide them with the anti-wear protection necessary in today's high speed and low speed gasoline and diesel motor oils. Further the invention allows steel under extreme pressure to yield or to respond to plastic deformation without the fracturing of the metal surface.

The additive incorporates the use of polymerized alpha olefins (PAO); hydroisomerized hydro-treated severe hydrocracked base oil; and optionally, synthetic sulfonates. Further, one can optionally employ vacuum distilled non aromatic solvents and liquefied polytetrafluoroethylene (PTFE) and when combined into the additive a specific sequence, this forms a finished product that exceeds the metal-protecting capability and benefits of ZDDP while providing an environmentally-friendly replacement. Further this product provides protection against steel-to-steel contact while positively influencing the chemical reactivity of worn metal surfaces. Further this product in independent testing reported in pending provisional application U.S. 62/109,172 has demonstrated the ability to modify the plastic response of steel placed under extreme pressure.

As previous indicated the ingredients of this additive when blended in a very specific sequence under specific conditions will provide a lubricant that has shown its ability to replace the need for ZDDP as an anti-wear agent in motors oils. The blending is a combination of accurately-controlled sheering and homogenization of the compounds resulting in a long-term stable blend. Once blended in a specific sequence, simple purification or physical separation, such as distillation or freezing, does not constitute synthesis, in the manner, for example, of making synthetic Group III and Group IV from crude oil via a chemical reaction. The finished product is a combination of:

Polymerized Alpha-Olefins

Hydroisomerized hydro-treated severe hydrocracked base oil

Optionally, Synthetic sulfonates

Optionally, vacuum distilled non aromatic solvents (less than 0.5% aromatics)

Optionally, liquefied polytetrafluoroethylene (PTFE) comprising a stable aqueous disbursement Synthetic lubricants have been successfully used for some time. They have the ability to offer very-high-viscosity index, low volatility, superior oxidation resistance, high thermal stability, excellent temperature fluidity and low toxicity to the environment. These characteristics in a finished lubricant are very important in modern high-speed and high-horsepower engines. Further these characteristics benefit the long term goals of being less toxic to the environment while providing maximum protection for automotive components. This synthetic lubricant when tested has demonstrated the ability to provide and exceed the anti-wear protection currently provided by the inclusion of ZDDP in motor oils. The synthetic lubricant can provide the necessary anti-wear in automotive, diesel and marine motor oil, but without the environmental impact of ZDDP. It has the ability to blend with, and be effective with, all of Group I, II, III, IV and Group base oils.

In its preferred embodiment, disclosed here is an environmentally-improved motor oil blend and related methods for properly lubricating components of an engine and favorably modifying a plastic response of components of the engine, the blend being free of zinc di-alkyl-di-thiophosphates (ZDDP) and free of zinc di-thiophosphate (ZDTP), comprising: a motor oil selected from the motor oil group consisting of Group I, Group II, Group III, Group IV, and Group V motor oils; a motor oil additive comprising alpha-olefins and hydroisomerized hydro-treated severe hydrocracked base oil; ZDDP omitted from the chemical constituents of the motor oil; and ZDTP omitted from the chemical constituents of the motor oil.

DETAILED DESCRIPTION

The preferred blending ratios for each of the components of this additive are shown below. It is important to maintain a blend of components falling within the following percentages:

Polymerized alpha-olefins (PAO): It is preferred that these comprise from 20% to 60% by volume. It is most preferred that these comprise approximately 55% by volume. One may also use alpha-olefins (AO) which have not been polymerized, though PAOs are preferred. One may also use the modern metallocene poly-alpha-olefins (mPAO) which have higher viscosity indexes than conventional PAOs.

Hydroisomerized high viscosity index (VI) hydro-treated (HT) severe hydro-cracked base oils: It is preferred that these comprise from 5% to 55% by volume. It is more preferred that these comprise from 7% to 25% by volume. It is most preferred that these comprise approximately 21% by volume. It is preferred, but not required, that these base oils have a viscosity grade 32. One may also use can also saturated hydrocarbons, process oil and hydraulic oil for this base oil.

Synthetic sulfonates: These are preferred, albeit optional ingredients. It is preferred that when used these comprise from 0.05% to 10% by volume. It is most preferred that these comprise approximately 3% by volume. It is preferred that these synthetic sulfonates comprise a total base number (TBN) from 200 to 600. It is most preferred that these comprise a 300 TBN. One may also use thixotropic calcium sulfonates.

Vacuum Distilled Low-Viscosity and Low-Aromatic Solvents: Often referred to as aliphatic or mineral spirits, these are optional ingredients. It is preferred that when used, these comprise from 10% to 40% by volume. It is most preferred that these comprise approximately 21.5% by volume. The low-aromatic range is preferred to be less than 0.5% aromatic. It is preferred that these solvents have a VOC Exemption, defined by the California Air Resources Board as including those compounds "not expected to meaningfully contribute to ozone formation due to their low reactivity in the atmosphere." The envisioned low viscosity is in the approximate range of 40 C mm2/s (ASTM D 445) and viscosity at 25 C cSt 2.60 and at 40 C cSt 1.98 (ASTM D 445).

Liquefied Polytetrafluoroethylene (PTFE): This is an optional ingredient. When used, it is preferred that these comprise from 0.001% to 10% by volume. It is most preferred that these comprise approximately 0.45% by volume. The PTFE should be liquefied to avoid agglomeration, and preferably comprise a stable aqueous dispersion of PTFE particles in water or oil. If oil is used, it is preferred to use 150 solvent neutral petroleum oil or an approximate equivalent.

The following describes the preferred method for blending these components to produce this motor oil additive.

Initially, the alpha olefins, and the base oils are blended until the liquid is a consistent amalgamation without any appearance of separation, to yield a first blend. Blending is based on speed of the agitator, and temperature will dictate the amount of time for the blend to complete. The blending time range may vary from 4 to 6 hours. The ideal temperature for each component is between 22 to 30 degrees centigrade for optimum blending.

Further, the vacuum distilled non-aromatic solvent and synthetic sulfonates are blended together to yield a second blend. This second blend may be prepared in a much smaller, high-speed, enclosed blender. This second blend is then added to the first blend.

PTFE is used, then the first and second blends are finally blended together with the PTFE.

If low-aromatic aliphatic solvent is used, then the first and second blends are blended with additional low-aromatic aliphatic solvents to produce a third blend. Then, if PTFE is used, all of the foregoing is blended together with the PTFE.

It is preferred that there is an approximate 25%/75% ratio of calcium sulfonates to aliphatic or mineral spirits, when these are used.

This third blend, or the mineral spirits alone absent the synthetic sulfonates, together with the balance of the ingredients, added to the first blend and the agitator is run until the components appear to have thoroughly blended into a consistent liquid. Following the blending, the product is sheered by a high speed sheering pump until the product is consistent. The sheering provides a stable flow viscosity exhibiting Newtonian behavior and greatly enhances the shelf life when there are substantial differences in specific gravity of each component.

The preferred blending equipment used in this process is as follows: This process involves several blending and holding tanks in which the product can be weighed and then pumped through control valves to maintain consistent flow and pressure. The blending should be performed in an enclosed tank to reduce product evaporation loss and prevent exposure to open spark. Blending equipment can be by a combination of high- or low-speed blending apparatus. The size or volume of the tank is not critical to the blend. Sheering equipment should have a range of 60 to 5200 cycles per second with a typical speed of 3600 cycle per second and be capable of making stable emulsions of products with oil ingredients providing liquid suspensions and dispersions without aeration.

This motor additive is then combined with a motor oil selected from the motor oil group consisting of Group I, Group II, Group III, Group IV, and Group V motor oils, without the use of ZDDP of ZDTP, to provide an environmentally-improved motor oil blend for properly lubricating components of an engine and favorably modifying a plastic response of components of the engine. The preferred blend ratio is from 85% to 95% by volume of motor oil, and from 5% to 15% by volume of the motor oil additive.

To create the motor-oil blend, the motor oil and the additive are combined together, and this combination is then simply mixed with a high-speed blender before being packaged. Given the chemical characteristics of motor oil and of the additive, there should be minimal or no separation thereafter while the packaged blend is maintained on a shelf, i.e., the blend should remain homogeneous for whatever shelf-life the motor oil blend may have before it is poured by a user into an engine.

While not the preferred mode of usage, one could take a motor oil with no ZDDP and no ZDTP and introduce that into an engine separately from introducing the lubricant. However, in this circumstance the user would need to take care to maintain an optimum mix of 85% to 95% by volume of motor oil and 5% to 15% by volume of the motor oil additive. Using a blend that is already combined in the desired ratios is preferred because the user need not then be concerned with maintaining the ratio of motor oil to additive within the desired ranges, and the possibility of user mistake is eliminated.

Referring to the API properties laid out earlier in the background of the invention, the overall combination of the motor oil with the lubricant, depending upon the viscosity of the host motor oil without ZDDP or ZDTP, will have the following characteristics: 1) For some selected temperatures: 100° C., kinematic viscosity 1.7 to 102.0; 40° C., kinematic viscosity 5.4 to 1350; −40° C.; kinematic viscosity 2,704 to 35,509. 2) Viscosity index: 90 to 200. 3) NOACK Volatility 0.6 to 99.5. 4) Pour point up to −20 to −61 C. Again, these ranges are dependent on the viscosity of the host oil. Finally, 5) the POA (or AO or mPAO) base should have a PAO Unsaturates viscosity grade from PAO-2 to PAO-100.

Generally, for motor oil blends, the range from PAO-2 to PAO-10 is sufficient. However, for other lubricating applications in which it is desirable to remove environmentally-undesirable chemicals such as ZDDP and ZDTP replace them with the alpha-olefin and base oil additive of this disclosure, given the understanding disclosed in U.S. 62/109,172 regarding how this additive favorably modifies plastic response and influences chemical reactivity, one may find it desirable to use alpha-olefins in the higher range up to and including PAO-100 for other lubricating applications, as outlined further below.

Specifically, it is also understood and disclosed here that the base combination of alpha-olefins and hydroisomerized hydro-treated severe hydrocracked base oil can serve as a replacement for environmentally-undesirable chemicals not only in motor oils, but in other lubricating/anti-wear agents and applications including, but not limited to:

Gear Oils
Automatic Transmission Fluids
Hydraulic Fluids
Greases
Turbine Oils and Fluids
Metal Working Oils
Chain Lubes
Compressor Lubricants
Conveyor Lubricants
Paper Machine Oil
Form Oils
Way Oils
Drill Oils
Drawing and Stamping Oil
Bar Oils
2 Cycle Oil
Steam Oil The ability to omit environmentally-undesirable chemicals in this broad range of circumstances, which chemicals are widely thought to be essential to providing proper lubrication and protecting against wear, emanates from the disclosure in U.S. 62/109,172 that this base combination of alpha-olefins and hydroisomerized hydro-treated severe hydrocracked base oil modifies the plastic response of steel and changes the chemical reactivity of the surfaces subjected to being worn down due to friction whereby these environmentally-undesirable chemicals were not detected under spectroscopic analysis of the wear tracks. So while a very important application of this disclosure is to motor oils because of the widespread usage of these oils and the consequent substantial environmental impact of these oils, it is also understood that the same favorable plastic response modifications and chemical reactivity changes will also transpire in many other applications, which enables this disclosure to be fruitfully applied to those other applications as well, and particularly, to the removal from fluids, lubricants and oils generally of environmentally-undesirable chemicals widely regarded to be essential for proper lubrication and anti-wear protection.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A method of producing a motor oil blend configured to lubricate an engine, comprising:
   blending alpha-olefins, K1 kerosene and a hydroisomerized and/or severe hydrocracked base oil.

2. The method of claim 1, said motor oil additive further comprising synthetic sulfonates.

3. The method of claim 2, said synthetic sulfonates comprising thixotropic calcium sulfonates.

4. The method of claim 1, said alpha-olefins comprising polymerized alpha-olefins.

5. The method of claim 4, said polymerized alpha-olefins comprising metallocene polymerized alpha-olefins.

6. The method of claim 1, said motor oil additive further comprising vacuum distilled non-aromatic solvent.

7. The method of claim 1, said motor oil additive further comprising liquefied polytetrafluoroethylene (PTFE).

8. The method of claim 1, wherein obtaining the motor oil additive comprises:
   blending said alpha-olefins with said base oil to produce a first blend;
   blending a non-aromatic solvent with synthetic sulfonates to produce a second blend; and blending said first and second blends with liquefied polytetrafluoroethylene (PTFE).

9. The method of claim 1, wherein the blending comprises:
   blending said alpha-olefins with said base oils to produce a first blend;
   blending non-aromatic solvent with synthetic sulfonates to produce a second blend;
   blending said first and second blends with additional low-aromatic aliphatic solvents to produce a third blend; and
   blending said first, second and third blends with liquefied polytetrafluoroethylene (PTFE).

10. A method, comprising:
    obtaining a motor oil blend comprising a motor oil and a motor oil additive, comprising:
       obtaining a Group I, Group II, Group Ill, Group IV, and Group V motor oil; and
    obtaining the motor oil additive, the motor oil additive comprising polymerized alpha-olefins, K-1 kerosene and hydroisomerized and/or severe hydrocracked base oil.

11. The method of claim 10, said motor oil additive further comprising synthetic sulfonates.

12. The method of claim 11, said synthetic sulfonates comprising thixotropic calcium sulfonates.

13. The method of claim 10, said alpha-olefins comprising polymerized alpha-olefins.

14. The method of claim 13, said polymerized alpha-olefins comprising metallocene polymerized alpha-olefins.

15. The method of claim 10, said motor oil additive further comprising vacuum distilled non-aromatic solvent.

16. The method of claim 10, motor oil additive further comprising liquefied polytetrafluoroethylene (PTFE).

* * * * *